(12) United States Patent
Thubert et al.

(10) Patent No.: US 10,904,882 B2
(45) Date of Patent: Jan. 26, 2021

(54) SYSTEMS AND METHODS FOR SCALING SHORT RANGE LOCAL AREA NETWORKS USING DUAL INTERFACED FIRST HUB NODES AND TRANSMISSION SCHEDULE MAPPING

(71) Applicant: Cisco Technology, Inc., San Jose, CA (US)

(72) Inventors: Pascal Thubert, Roquefort les Pins (FR); Jp Vasseur, Saint Martin d'Uriage (FR); Eric Levy-Abegnoli, Valbonne (FR); Patrick Wetterwald, Mouans Sartoux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/363,285

(22) Filed: Mar. 25, 2019

(65) Prior Publication Data
US 2020/0314841 A1    Oct. 1, 2020

(51) Int. Cl.
*H04W 72/04*    (2009.01)
*H04W 40/02*    (2009.01)
(Continued)

(52) U.S. Cl.
CPC ....... *H04W 72/0446* (2013.01); *H04W 40/02* (2013.01); *H04W 56/001* (2013.01); *H04W 72/12* (2013.01); *H04W 80/00* (2013.01)

(58) Field of Classification Search
CPC . H04W 72/0446; H04W 72/12; H04W 40/02; H04W 56/001; H04W 80/00
See application file for complete search history.

(56) References Cited

U.S. PATENT DOCUMENTS 9,800,506 B2    10/2017    Vasseur et al.
2005/0141509 A1 *  6/2005  Rabie ................. H04L 12/5602
                                                    370/395.1
(Continued)

FOREIGN PATENT DOCUMENTS

WO    WO 2015081553 A1 *  6/2015

OTHER PUBLICATIONS

Papadopoulos et al., Leapfrog Collaboration: Toward Determinism and Predictability in Industrial-IoT applications, 2017 IEEE International Conference on Communications (ICC), SAC Symposium Internet of Things Track, May 21-25, 2017, Paris France, (Year: 2017).*

(Continued)

*Primary Examiner* — Shailendra Kumar
(74) *Attorney, Agent, or Firm* — Polsinelli PC

(57) ABSTRACT

Disclosed are systems, methods, and computer-readable media for integrating deterministic packet transmissions scheduling of short range local area networks (e.g., 6TiSCH networks) with deterministic packet transmission scheduling for wireless networks such as LTE/4G/5G networks. In one aspect, a wireless communication network includes a plurality of first nodes configured to communicate using a first communication protocol; and a second node configured to communicate with the plurality of first nodes using the first communication protocol and configured to communicate with a third node using a second communication protocol, the second node being further configured to map corresponding transmission schedule of the first communication protocol to a second transmission schedule for the second communication protocol.

20 Claims, 7 Drawing Sheets

(51) Int. Cl.
*H04W 56/00* (2009.01)
*H04W 72/12* (2009.01)
*H04W 80/00* (2009.01)

(56) References Cited

U.S. PATENT DOCUMENTS

| | | | | |
|---|---|---|---|---|
| 2005/0144327 | A1* | 6/2005 | Rabie | H04L 12/4641 |
| | | | | 709/249 |
| 2008/0159239 | A1* | 7/2008 | Odlyzko | H04W 72/1215 |
| | | | | 370/337 |
| 2013/0223458 | A1* | 8/2013 | Bui | H04J 3/0667 |
| | | | | 370/503 |
| 2015/0312797 | A1* | 10/2015 | Cui | H04W 36/12 |
| | | | | 370/329 |
| 2016/0373964 | A1* | 12/2016 | Nagasaka | H04W 76/12 |
| 2018/0027473 | A1 | 1/2018 | Kalogridis et al. | |
| 2018/0176853 | A1* | 6/2018 | Chen | H04W 40/28 |
| 2018/0213459 | A1 | 7/2018 | Chen et al. | |
| 2018/0287760 | A1* | 10/2018 | Choi | H04L 5/0094 |
| 2018/0352605 | A1* | 12/2018 | Clegg | H04L 12/4625 |

OTHER PUBLICATIONS

M. Baker, LTE-Advanced Physical Layer, REV-090003r1 IMT-Advanced Evaluation Workshop Dec. 17-18, 2009, Beijing (Year: 2009).*
Duquennoy et al., TSCH and 6TiSCH for Contiki: Challenges, Design and Evaluation, 2017 13th International Conference on Distributed Computing in Sensor Systems, IEEE Computer Society, Jun. 5, 2017, pp. 11-18. (Year: 2017).*
Thubert, P., "An Architecture for IPv6 over the TSCH mode of IEEE 802.15.4," draft-ietf-6tisch-architecture-17, available at https://tools.ietf.org/html/draft-ietf-6tisch-architecture-17, Nov. 10, 2018, pp. 1-122.
Elbakoury, Hesham, "Ultra-Low Latency (ULL) Networks: A Comprehensive Survey Covering the IEEE TSN Standard and Related ULL Research," Mar. 2018, pp. 1-59.
International Search Report and Written Opinion from the International Searching Authority, dated Jun. 4, 2020, 16 pages, for corresponding International Patent Application No. PCT/US2020/024178.
Duquennoy, Simon, et al., "TSCH and 6TiSCH for Contiki: Challenges, Design and Evaluation," 2017 13th International Conference on Distributed Computing in Sensor Systems, Jun. 5, 2017, pp. 11-18.
ETSI, "IPv6-based Industrial Internet leveraging 6TiSCH technology," ETSI GR IP6 009 v1.1.1 (Mar. 2017), Mar. 1, 2017, pp. 1-48.
Thubert, P., et al., "An Architecture for IPv6 over the TSCH mode of IEEE 802.15.4," draft-ietf-6tisch-architecture-20, Mar. 1, 2019, pp. 1-61.

* cited by examiner

SYSTEMS AND METHODS FOR SCALING SHORT RANGE LOCAL AREA NETWORKS USING DUAL INTERFACED FIRST HUB NODES AND TRANSMISSION SCHEDULE MAPPING

TECHNICAL FIELD

The present technology pertains in general to scaling of short range local area deterministic networks through coupling such short range local area networks to a different deterministic network and mapping of respective transmission schedules using a dual interfaced first hop node.

BACKGROUND

IPv6 over Time Slotted Channel Hopping (6TiSCH) wireless communication networks operate are deterministic networks, where sending and receiving of data packets between different nodes of such networks can almost be precisely controlled (e.g., within a bounded timeframe). This category of networking may be used for various applications such as industrial automation, vehicle control systems, and other systems that require the precise delivery of control commands to a controlled device. Other examples of 6TiSCH networking can be in Low power and lossy networks (LLNs), e.g., Internet of Things (IoT) networks, which have a myriad of applications, such as sensor networks, smart grids, and smart cities.

In 6TiSCH based networks, typically a Routing Protocol for Lossy Networks (RPL) tree is constructed according to IEEE 802.115.4e networking protocols and transmissions of packets are scheduled according a matrix of frequency and time. Generally, a single node referred to as RPL root (first hop) in a 6TiSCH network handles computation and maintenance of paths and connections to all nodes of a 6TiSCH network. Therefore, such RPL root may need additional memory and processing capabilities to carry out such functionalities. Furthermore, such RPL roots are limited by IEEE 802.15.4e standard to short distances and low throughputs, which limit scalability of 6TiSCH networks on factory floors or in general over large geographical area.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
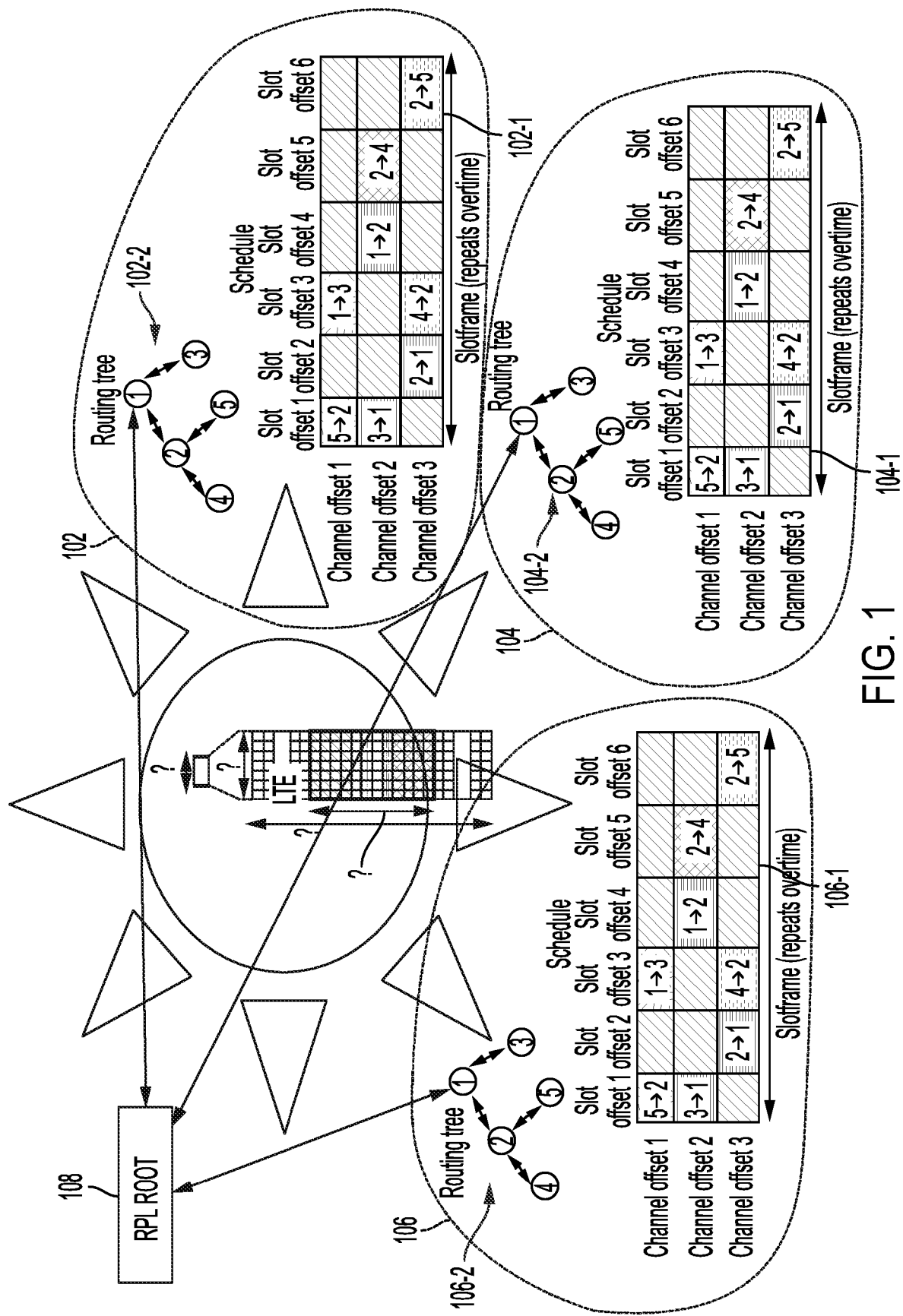
FIG. 1 illustrates an example system, according to one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, methods, and computer-readable media for integrating (coupling) deterministic packet transmissions scheduling of short range local area networks (e.g., 6TiSCH networks, which is IPv6 over Time Slotted Channel Hopping (TSCH) networks) with deterministic packet transmission scheduling for wireless networks such as LTE/4G/5G networks. More specifically and as will be described below, a first hop node of any given 6TiSCH network may be a device with dual wireless communication capabilities (dual interfaces) that can communicate with other nodes of the 6TiSCH network using IEEE 802.15.4 protocols on one interface and a $3^{rd}$ Generation Partnership Project (3GPP) radio on another interface for communicating with RPL root. The first hop, relying on time synchronization of transmission schedules of 6TiSCH nodes and LTE/4G/5G, performs a mapping of scheduled transmission timeslots of relevant/connected 6TiSCH nodes to LTE resource blocks on the LTE/4G/5G network and vice-versa. This mapping allows scaling and enhancement of 6TiSCH networks by allowing connectivity between different 6TiSCH networks (6TiSCH islands) using the RPL root.

In one aspect of the present disclosure, a wireless communication network includes a plurality of first nodes configured to communicate using a first communication protocol; and a second node configured to communicate with the plurality of first nodes using the first communication protocol and configured to communicate with a third node using a second communication protocol, the second node being further configured to map corresponding transmission schedule of the first communication protocol to a second transmission schedule for the second communication protocol.

In one aspect of the present disclosure, a method includes receiving, at a first node of a first communication network, a packet for delivery to a destination, the first node communicating with a plurality of second nodes of the first communication network using a first communication protocol and with a third node using a second communication protocol; determining, at the first node, whether the packet is received from one of the plurality of second nodes or from the third node to yield a determination; mapping, by the first node and based on the determination, the packet to one of at least one frame of a first transmission schedule for communicating with the plurality of second nodes or at least one resource element of a second transmission schedule for communicating with the third node; and sending, by the first node, the packet to the destination based on the mapping and corresponding one of the first transmission schedule and the second transmission schedule.

In one aspect of the present disclosure, one or more non-transitory computer-readable media have computer-readable instruction stored thereon, which when executed by one or more processors, cause the one or more processors to receive a packet for delivery to a destination, the first node communicating with a plurality of second nodes of the first communication network using a first communication protocol and with a third node using a second communication protocol; determine whether the packet is received from one of the plurality of second nodes or from the third node to yield a determination; map, based on the determination, the packet to one of at least one frame of a first transmission schedule for communicating with the plurality of second nodes or at least one resource element of a second transmission schedule for communicating with the third node; and send the packet to the destination based on the mapping and corresponding one of the first transmission schedule and the second transmission schedule.

DETAILED DESCRIPTION

The disclosed technology addresses the need in the art for a method of scaling and interconnecting 6TiSCH networks, whereby higher transmission capabilities of LTE/4G/5G networks are leveraged to map transmission schedules of packets within a given 6TiSCH network to resource blocks that provide packet transmission schedules in the LTE/4G/5G network.

The disclosure begins with a description of example system.

FIG. 1 illustrates an example system, according to one aspect of the present disclosure. System 100 may be formed of network islands 102, 104 and 106. Each of network islands (network meshes or simply meshes) 102, 104 and 106 may be an example 6TiSCH network formed of respective nodes 1, 2, 3, 4 and 5 connected according to a specific topology such as that between nodes 1, 2, 3, 4 and 5 shown in FIG. 1. As noted, nodes 1, 2, 3, 4 and 5 of each network island 102, 104 and 106 may operate according to IPv6 Routing Protocol for Low-power and Lossy Networks (RPL) specified by IEEE 802.15.4e standards. IEEE 802.15.4 is a local area network standard with connectivity typically within a limited range (e.g., 10 to 30 meters).

As also shown in FIG. 1, network island 102 may have a corresponding 6TiSCH transmission schedule 102-1, which defines in a deterministic manner and using a matrix of time and frequency, a schedule of packet transmission between any two of respective nodes 1, 2, 3, 4 and 5 of network island 102 having example network topology 102-2.

Similarly, network island 104 may have a corresponding 6TiSCH transmission schedule 104-1, which defines in a deterministic manner and using a matrix of time and frequency a schedule of packet transmission between any two of respective nodes 1, 2, 3, 4 and 5 of network island 104 having example network topology 104-2.

Similarly, network island 106 may have a corresponding 6TiSCH transmission schedule 106-1, which defines in a deterministic manner and using a matrix of time and frequency a schedule of packet transmission between any two of respective nodes 1, 2, 3, 4 and 5 of network island 106 having example network topology 106-2.

It should be noted that while in FIG. 1, transmissions schedule 102-1, 104-1 and 106-1 and topologies 102-2, 104-2 and 106-2 are the same, the present disclosure is not limited to different network islands having same transmission schedules and topologies. Instead, each network island may have its own unique transmission schedule and network topology.

Furthermore, node 1 of each of network islands 102, 104 and 106 may be a device having dual communication interfaces. For example, node 1 of each of network islands 102, 104 and 106 can have a wireless interface card for communicating with remaining nodes of respective one of network islands 102, 104 and 106 based on IEEE 802.15.4 standards and another wireless interface (3GPP) for communicating with RPL root 108 according to LTE/4G/5G standards. In other words, node 1 of each of network islands 102, 104 and 106 may establish a northbound communication with the RPL root 108 and southbound communications with nodes 2, 3, 4 and 5.

In example of FIG. 1 only node 1 of each network island 102, 104 and 106 is a dual interface device while remaining devices within each of network islands 102, 104 and 106 may communicate using only one interface and according to RPL specified by IEEE 802.15.4e standards. Node 1 may also be referred to as a first hop node.

Each one of devices 1, 2, 3, 4 and 5 of each network island 102, 104 and 106 may be any one of, but not limited to, a sensor, an actuator, an Internet of Things (IoT) device, a smart network object, robots, etc.

RPL root 308 of system 100 may be an eNodeB of an LTE network, a gNB of a 5G network, an indoor small cell base station, etc. RPL root 108 (or base station 108) may be a base station serving a geographical location in which network islands 102, 104 and 106 are implemented. In one example, geographical dispersity of network islands 102, 104 and 106 may vary depending on coverage area of RPL root 108 and reachability thereof by any one of first hop nodes of network islands 102, 104 and 106.

As noted above, network islands 102, 104 and 106 may be distributed over a geographical area such as a factory floor, a resource field, a refinery, etc. As will be described below, using LTE connection of node 1 of each network island 102, 104 and 106 with RPL root 308, it is possible to interconnect network islands 102, 104 and 106 to create a larger 6TiSCH network formed of the three smaller network islands 102, 104 and 106.

Figure 2:
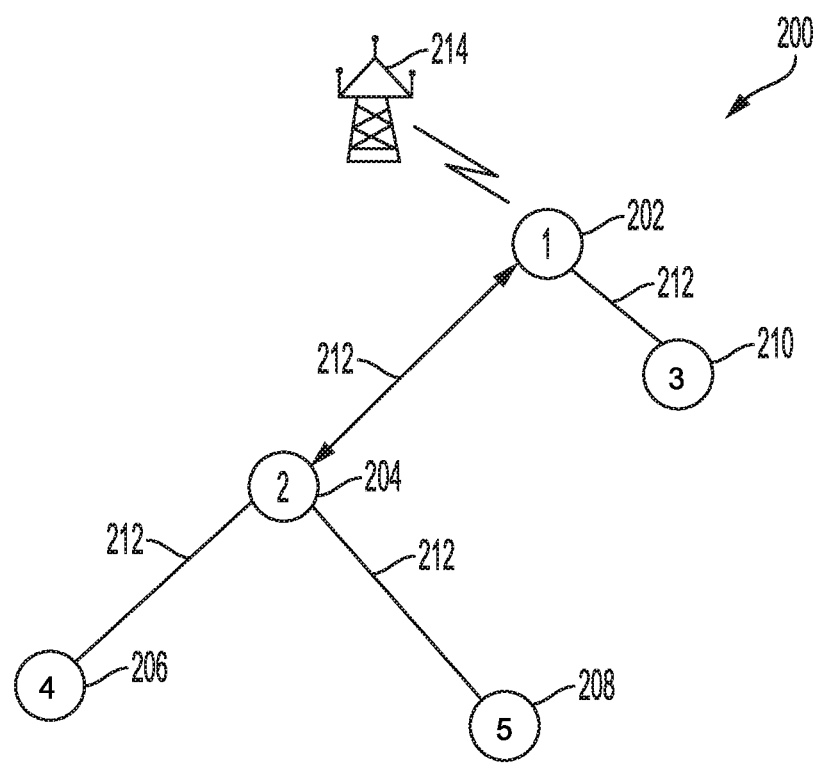
FIG. 2 is an example 6TiSCH network according to one aspect of the present disclosure.

FIG. 2 is an example 6TiSCH network according to one aspect of the present disclosure.

FIG. 2 is a schematic block diagram of an example network 200 that includes nodes/devices 202, 204, 206, 208 and 210 interconnected by various methods of communication. For instance, the links 212 may be wired links or shared media (e.g., wireless links, PLC links, etc.) where certain one of nodes 202, 204, 206, 208 and 210, such as, e.g., routers, sensors, computers, etc., may be in communication with other nodes one of nodes 202, 204, 206, 208 and 210, e.g., based on distance, signal strength, current operational status, location, etc. Those skilled in the art will understand that any number of nodes, devices, links, etc. may be used in the computer network, and that the view shown herein is illustrative and non-limiting. Hereinafter, references may be made to nodes 1, 2, 3, 4 and 5 or nodes 202, 204, 206 208 and 210. It should be understood that for purposes of the present disclosure, node 1 and node 202 are the same, node 2 and node 204 are the same, node 3 and node 206 are the same, node 4 and node 208 are the same and node 5 and node 210 are the same.

Node 202 of network 200 may be a dual interfaced device, described also with reference to FIG. 1, which can communicate with nodes 204, 206, 208 and 210 according to RPL protocol while also communicating with RPL root 214 (similar or same as RPL root 108 of FIG. 1) using any known or to be developed deterministic communication protocol such as 3GPP communication protocol for LTE/4G/5G networks. Node 202 may also be referred to as a first hop node similar to node 1.

Data packets (e.g., traffic and/or messages sent between devices/nodes 202, 204, 206, 208 and 210) may be exchanged among the nodes/devices of network 200 using predefined network communication protocols such as certain known wired protocols, wireless protocols (e.g., IEEE Std. 802.15.4 or other deterministic shared-media protocols) where appropriate. In this context, a protocol consists of a set of rules defining how the nodes interact with each other. One communication technique that may be used to implement links 212 is channel-hopping. Also known as frequency hopping, use of such a technique generally entails wireless devices "hopping" (e.g., alternating) between different transmission and reception frequencies according to a known schedule (hence the term deterministic networking). Such deterministic wireless hopping may be according to a transmission schedule formed as a matrix of time and frequency.

Figure 3:
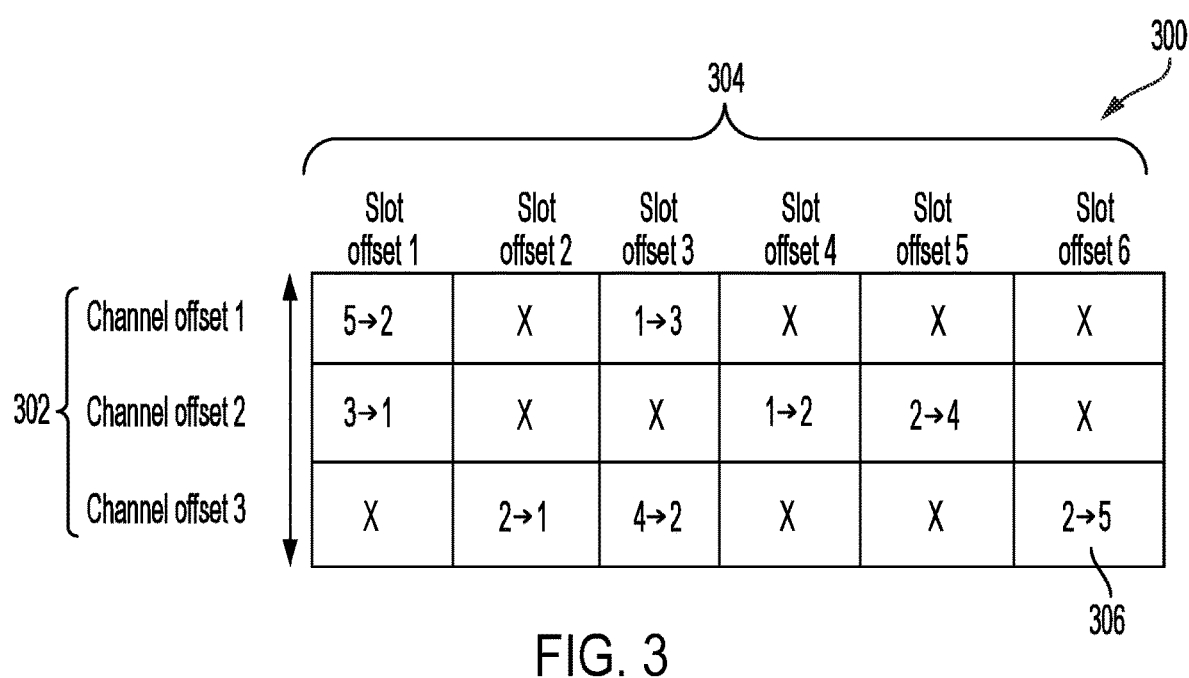
FIG. 3 illustrates an example 6TiSCH transmission schedule for network of FIGS. 1 and 2, according to one aspect of the present disclosure.

FIG. 3 illustrates an example 6TiSCH transmission schedule for network of FIGS. 1 and 2, according to one aspect of the present disclosure.

Referring now to FIG. 3, an example channel distribution/ usage (CDU) matrix 300 (transmission schedule) is shown that may be used by the nodes/devices 202, 204, 206, 208 and/or 210 in network 200 of FIG. 2 or any one of network islands 102, 104 and 106 of FIG. 1. Matrix 300 may be the same as any one of transmission schedules 102-1, 104-1 and 106-1 of FIG. 1.

Notably, 6TiSCH defines a CDU matrix that may repeat itself over time and represents the global characteristics of the network such as used/unused channels, timeslot durations, number of time slots per iteration, etc. As shown, CDU matrix 300 may include an index of channel offsets 302 along a first axis that correspond to the channels available for use in network 200 of FIG. 2 or any one of network islands 102, 104 and 106 of FIG. 1. (e.g., offsets for each of three available channels). As would be appreciated, any number of channels may be used in the network up to maximum number of available channels (e.g., 16 channels). Along the other axis are slot offsets 304 that correspond to differing time slots, the combination of which is equal to one period of the network scheduling operation. Accordingly, transmission schedule 300 may be repeated periodically.

CDU matrix 300 may be used to define the basic wireless communication operations for network 200 of FIG. 2 or any one of network islands 102, 104 and 106 of FIG. 1. For example, CDU matrix 300 may be used to define the duration of a timeslot (e.g., between 10 to 15 ms), the period of an iteration (e.g., the total number of time slots, indexed by slot offsets 304), and the number of channels (e.g., indexed by channel offset 302) to which the MAC may jump.

CDU matrix 300 may include a number of cells 306 (e.g., 28 cells in example of FIG. 3), where each cell 306 is defined by the pair (slot offset, channel offset). During runtime, the actual channel at which a given transmission happens may be rotated to avoid interferences such as self-inflicted multipath fading.

Each cell 306 may or may not indicate a scheduled transmission from one node to another. FIG. 3 includes several examples of such scheduled transmissions with reference to nodes 1, 2, 3, 4 and 5 of each of network islands 102, 104 and 106 of FIG. 1. For example, cell 306 (1, 1), which is cell 306 corresponding to channel offset 1 and slot offset 1, indicates scheduled transmission from node 5 to node 2. Example table 300 includes several other scheduled transmissions in several other cells 306, while several cells 306 marked with "x" are cells during which no transmission is scheduled.

As noted earlier, RPL is a deterministic communication scheme where each node's communication timing and schedule are almost precisely determined and known. Another example of a deterministic communication scheme is $3^{rd}$ Generation Partnership Project (3GPP) and Long Term Evolution (LTE) connections between nodes (e.g., LTE capable devices and base stations).

Figure 4:
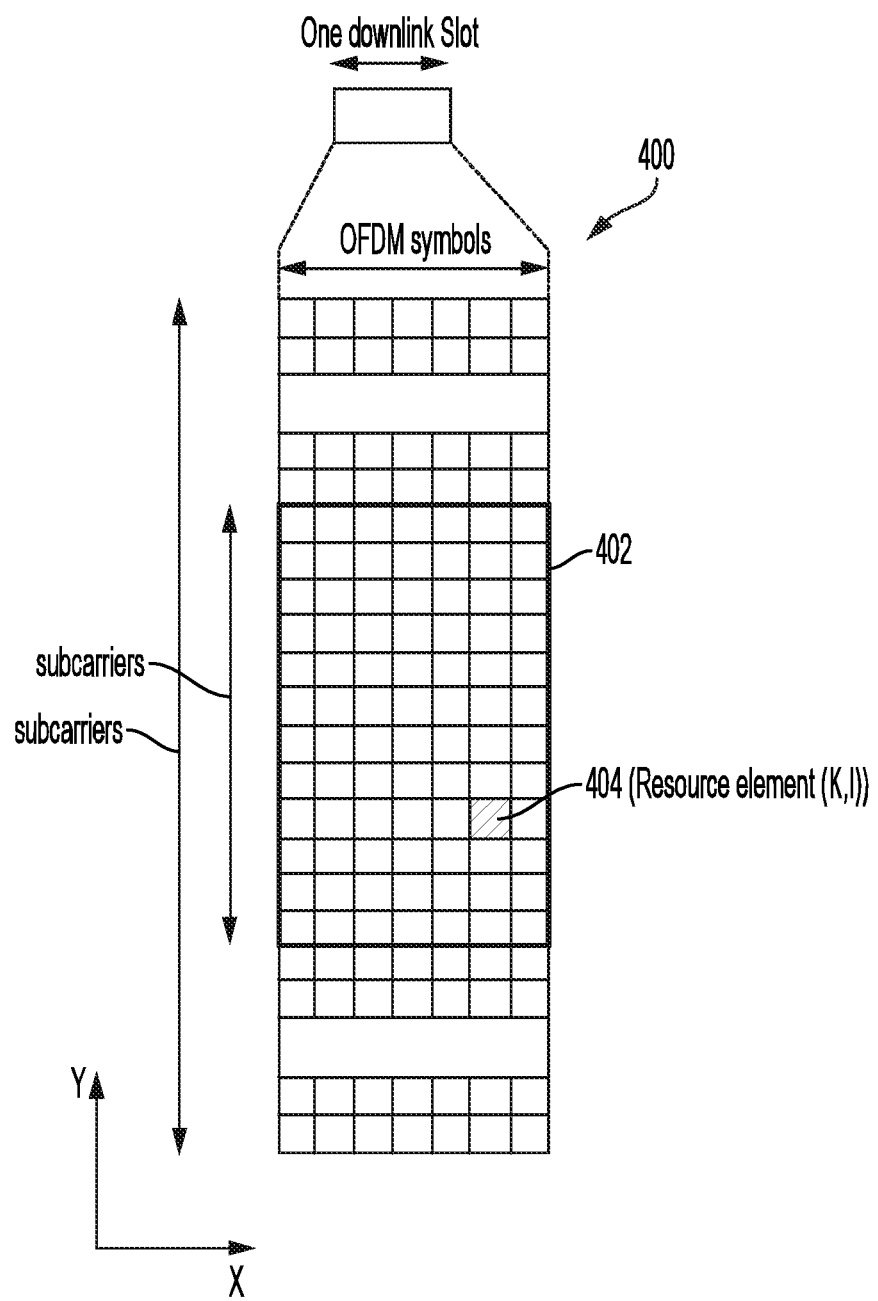
FIG. 4 illustrates an example LTE communication scheduling scheme, according to one aspect of the present disclosure.

FIG. 4 illustrates an example LTE communication scheduling scheme, according to one aspect of the present disclosure. Within the context of LTE/4G/5G networks, a Resource Element (RE) is the basic unit of Physical Resource (PR) in LTE. A device such as a user equipment (UE), competes with other UEs to get more and more resource elements assigned to the UE in Downlink and Uplink. The number of resource elements assigned to a UE is directly proportional to the data rate experienced by the UE.

An LTE radio frame (10 milliseconds (ms)) is divided into 10 sub-frames, each of which may be further subdivided into 2 slots (0.5 ms each). One slot corresponds to 6 or 7 Orthogonal Frequency Division Multiplexing (OFDM) symbols depending upon normal or extended cyclic prefix in use. Sub-carriers on Y-Axis and the OFDM symbols on X-axis form a resource grid, as shown in FIG. 4, which is a transmission schedule, within an LTE network, specifying each connected device's turn for using the available spectrum for uplink and downlink data transmission to and from a base station (e.g., an eNodeB).

As shown in FIG. 4, a resource grid 400 corresponds to slot or one subframe of a 10 ms LTE radio frame. In other words, an LTE radio frame may be formed by concatenation of 20 resource grids such as resource grid 400. An LTE radio frame may specify a transmission schedule for an LTE base station (eNodeB) and end terminals and UEs connected thereto.

Resource grid 400 may be formed of multiple resource blocks, an example of which is resource block 402. Resource block 402 is formed of 7 OFDM symbols on the X-axis and an example 12 subcarriers on the Y-axis. Resource block 402 is formed of resource elements 404 (7×12 resource elements), each of which may be represented as indexed pair (k, I), where k ranges from 0 to subcarrier threshold (e.g., 12 in this example) and I ranges from 0 to maximum number of OFDM symbols (e.g., 7 in this example).

As noted above, an LTE radio frame has a periodicity of 10 ms, which aligns with periodicity of 6TiSCH time slots. Each time slot of transmission schedule 300 for 6TiSCH networking is 0.5 ms (same as each subframe of an LTE radio frame).

As noted above, with currently implemented 6TiSCH networks and meshes, the first hop is also an RPL root, which limits scalability of 6TiSCH networks due to relatively low packet processing capabilities and resources of such first hop nodes. Accordingly and as will be described below in more detail, making a base station an RPL root such as RPL 108 shown in FIG. 1 and deploying a dual interfaced device as a first hop in each 6TiSCH network, allows mapping of frames of each 6TiSCH network to a subset of resource elements of an LTE resource block reserved for node 1(202) for uplink/downlink communication with RPL root 108. This may be referred to as mapping of transmission schedule of one (deterministic) wireless communication protocol to a transmission schedule of another (deterministic) wireless communication protocol and vice-versa.

Figure 5:
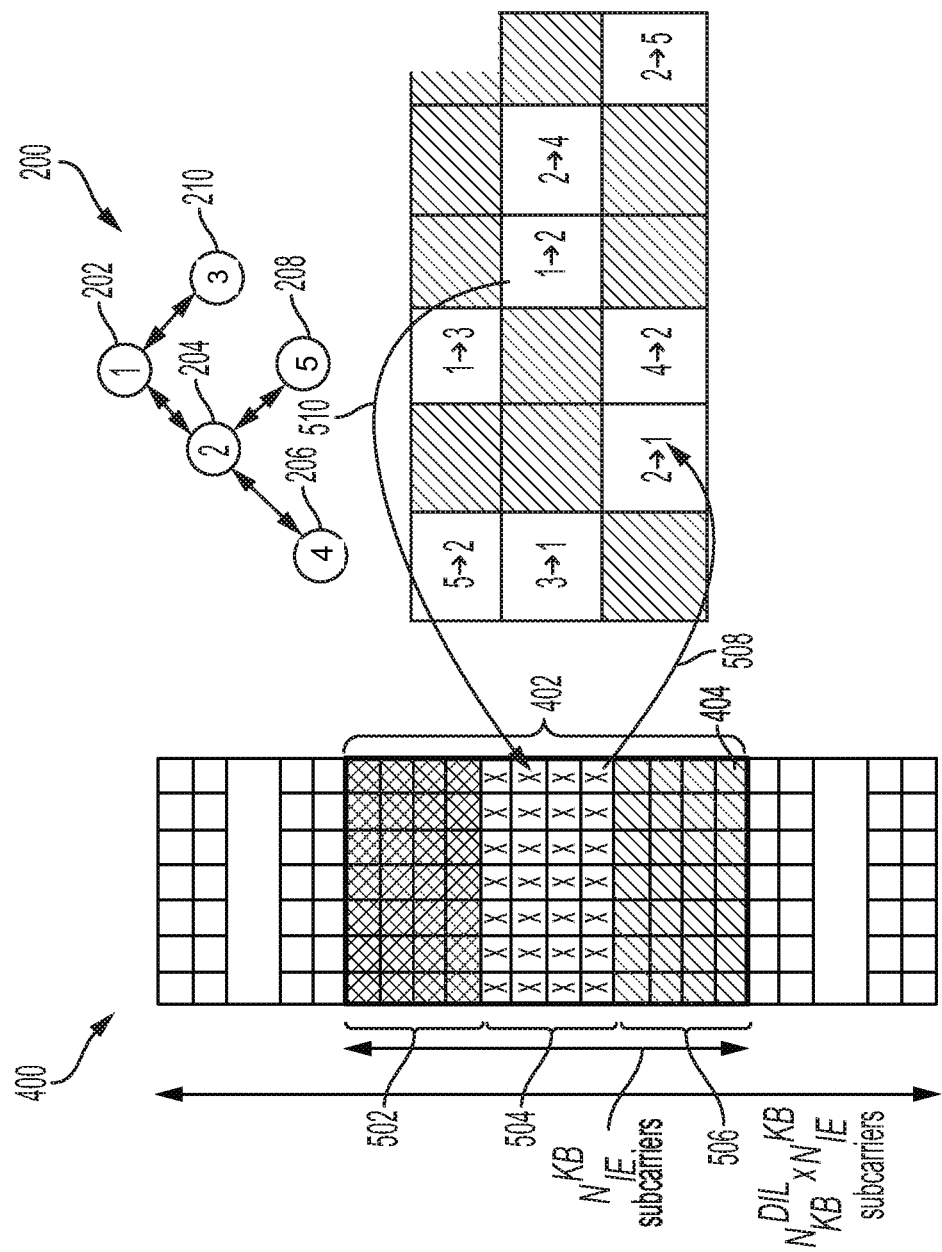
FIG. 5 illustrates an example mapping of transmission schedules, according to an aspect of the present disclosure.

FIG. 5 illustrates an example mapping of transmission schedules, according to an aspect of the present disclosure.

FIG. 5 illustrates example resource grid 400 of FIG. 4 side by side with example transmission schedule 300 of FIG. 3 and example topology of 6TiSCh network 200 of FIG. 2 (same as example topology 102-2, 104-2 and/or 106-2 in FIG. 1). As noted, resource grid 400 may have a plurality of or a group of resource elements 404 forming a resource block such as resource block 402. For example mapping purpose of the present disclosure, resource elements 404 of resource block 402 may be grouped into different subsets of resource elements such as subsets 502, 504 and 506. The mapping may be as follows.

If one or more 6TiSCH frames (also referred to as an 802.15.4 frames) is/are received at node 1(202) from node 2(204) and is/are destined for another node within another 6TiSCH network island, then such frame(s) may be mapped to one or more resource elements in subset 502 for transmission to RPL root 108 and ultimately to its intended destination(s). This is shown by arrow 508 in FIG. 5.

On the other hand, if one or more data packets are received in a specific resource element or sets of resource elements from RPL root 108, then node 1(202) may map the received frame to a specific cell 306 within transmission schedule 300 for transmission to node 2(204). This is shown by arrow 510 in FIG. 5.

The above illustrates a process of mapping two 6TiSCH time slots of transmission schedule 300 to a subset of resource elements within resource block 402. While it is possible to group resource elements and 6TiSCH time slots for mapping (many to many mapping), the present disclosure is not limited thereto. For example, a single 6TiSCH time slot may be mapped to a subset of resource elements (one to many mapping), a group of two or more 6TiSCH time slots may be mapped to a single resource element may be mapped (many to one mapping), a single 6TiSCH time slot may be mapped to a single resource element (one to one mapping), etc.

In one example, such mapping scheme may be periodically updated/modified by an operator of network islands 102, 104, 106 and/or operator of LTE network that operates RPL root 108. The mapping may be stored in an associated memory of node 1(202) as a mapping table.

Figure 6:
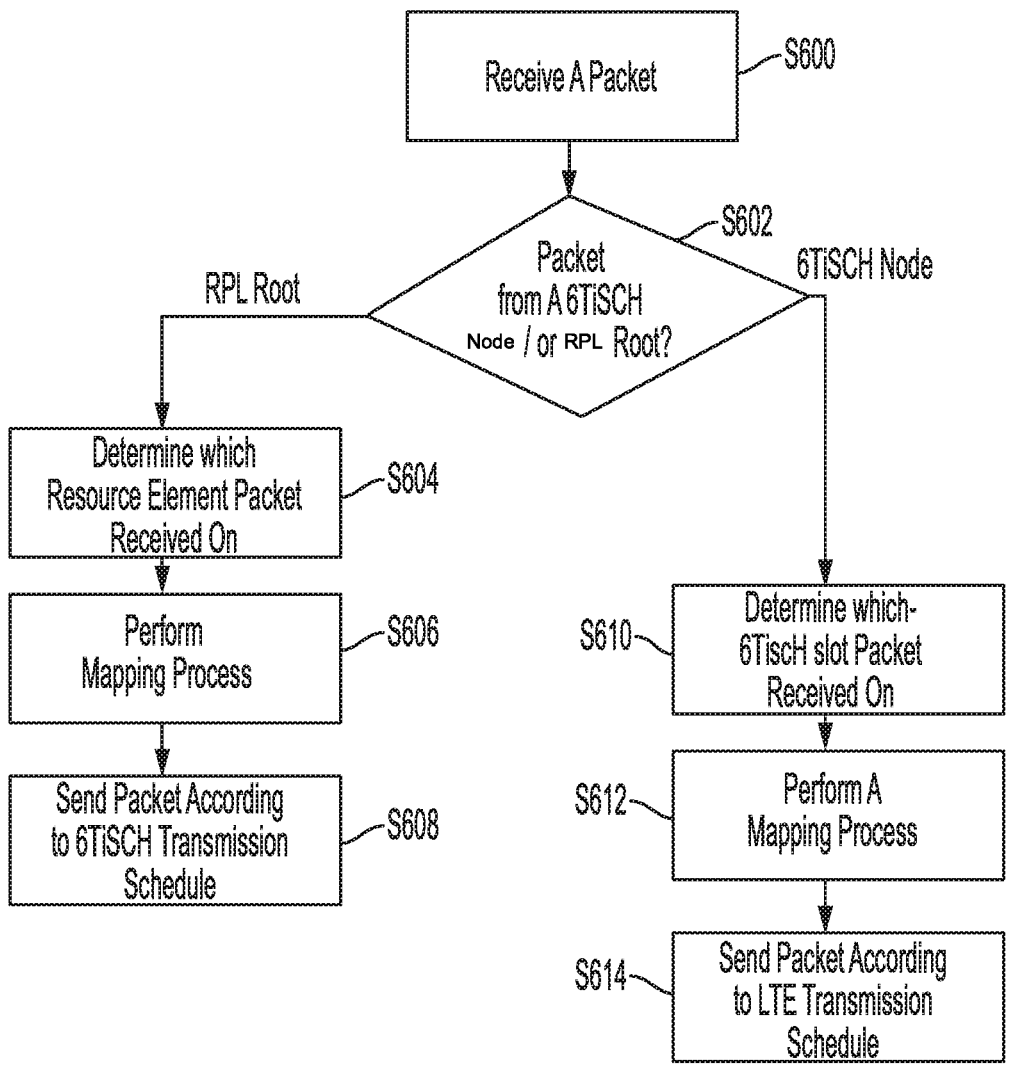
FIG. 6 provides an example method for scaling 6TiSCH networks using LTE resources, according to one aspect of the present application.

With an example mapping as described above, FIG. 6 provides an example method for scaling 6TiSCH networks using LTE resources, according to one aspect of the present application. FIG. 6 will be described from perspective of node 1 of any one of network islands 102, 104 and 106 of FIG. 1 and/or node 202 of FIG. 2. However, it will be understood that node 1(202) may have one or more memories storing computer-readable instructions, which when executed by one or more processors, cause the one or more processors to perform functionalities of FIG. 6. FIG. 6 may be described with reference to any one of FIGS. 1-5.

At S600, node 1(202) may receive a packet for transmission to a destination (e.g., another network node within the same or different network). A packet may be received from any one of southbound 6TiSCH nodes (e.g., a plurality of nodes formed of nodes 2, 3, 4 and/or 5 in FIG. 1 or nodes 204, 206, 208 and/or 210 in FIG. 2). This may be referred to as an 802.15.4 radio frame. Alternatively such packet may be received from northbound RPL root 108 and may be referred to as an LTE or 3GPP packet.

In one example, prior to, simultaneous with or after S600, for purposes of enabling the mapping the frames of 6TiSCH network to resource element(s) of the LTE network, node 1(202) may synchronize its clock (hence its transmission schedule) with a master clock of the RPL root 108 and in general with master clock of the LTE network.

At S602, node 1(202) determines if the received packet is from a southbound 6TiSCH node or northbound RPL root 108 (third node). For example, at S602, node 1(202) determines if the received packet is an 802.15.4 radio frame or an LTE/3GPP packet.

If the packet is from a northbound RPL Root, then at S604, node 1(202) determines which resource element or a subset of resource elements (e.g., one of subsets 502, 504 or 506), as described with reference to FIG. 5, the packet is received on.

Thereafter, at S606, node 1(202) performs a mapping process whereby node 1(202) determines, based on a mapping table described with reference to FIG. 5, which 6TiSCH slot of the 6TiSCH transmission schedule (e.g., table 300), should the packet be mapped to and scheduled for transmission to a destination node (e.g., one of nodes 2, 3, 4 and/or 5 in FIG. 1 or nodes 204, 206, 208 and/or 210 in FIG. 2).

As noted above, the mapping table provides a mapping of a transmission schedule (e.g., time slots) of a first communication protocol (e.g., IEEE 802.15.4 protocol) of a first network (e.g., a 6TiSCH network) to a transmission schedule (e.g., resource element(s)) of a second communication protocol (e.g., 3GPP protocol) of a second network (e.g., an LTE/4G/5G network) and vice-versa.

Once scheduled, at S608, node 1(202) may send the packet according to 6TiSCH transmission schedule on its southbound IEEE 802.15.4 interface to the intended destination node. For purposes of this southbound transmission, node 1(202) may generate 802.15.4 frames sorted by next hop address within the 6TiSCH network for ultimate delivery to the intended destination.

Referring back to S602, if node 1(202) determines that the received packet is from a southbound 6TiSCH node, then at S610, node 1(202) determines which 6TiSCH time slot (e.g., one of cells 306) the packet is received on.

Thereafter, at S612, node 1(202) performs another mapping process, whereby node 1(202) determines, based on a mapping described with reference to FIG. 5, which resource element or a subset of resource elements (e.g., one of subsets 502, 504 or 506), as described with reference to FIG. 5, the packet should be embedded in so as to be encapsulated within LTE resource block 402 for transmission to RPL 108 on 3GPP interface of node 1(202).

At S614, node 1(20) sends the LTE encapsulated 6TiSCH packet to RPL root 108 on its 3GPP interface. This transmission and determination of the appropriate LTE connection to be used for sending the packet to RPL root 108 may be based on destination MAC address included in the received packet.

In example embodiments above, while a single first hop node having dual interface and communication capabilities and a single RPL root are described for scaling such short range local area networks (e.g., 6TiSCH networks), the present disclosure is not limited thereto and each such short range local area network may include multiple dual interfaced hops that may be in communication with more than one RPL root (e.g., multiple base stations) on their LTE interfaces.

Figure 7:
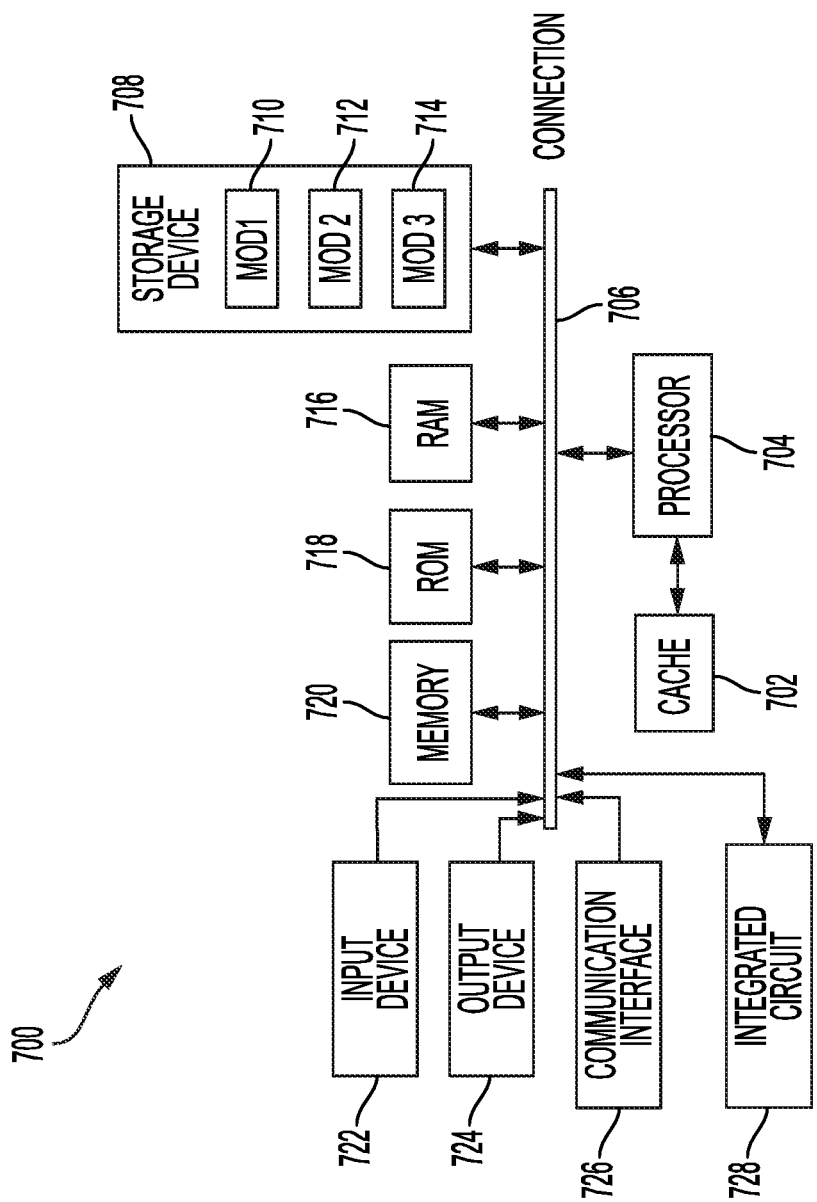
FIG. 7 illustrates an example system including various hardware computing components, according to an aspect of the present disclosure.

Example embodiments above describe scaling of a short-range local area deterministic network (e.g., 6TiSCH network) by using a dual interfaced device as a first hop in such network and using the first hop to communicate with an RPL root on an LTE connection (example of anther deterministic network), where mapping of transmission schedules of one deterministic network to another is leveraged to scale the operation of the short range local area deterministic network. The disclosure now turns to describing example hardware components that may be used to implement node 1(202), RPL 108, etc. FIG. 7 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 7 illustrates a system bus computing system architecture (system) 700 wherein the components of the system are in electrical communication with each other using a connection 706. Exemplary system 700 includes a cache 702 and a processing unit (CPU or processor) 704 and a system connection 706 that couples various system components including the system memory 720, such as read only memory (ROM) 718 and random access memory (RAM) 716, to the processor 704. System 700 can include a cache of high-speed memory connected directly with, in close proximity to, or integrated as part of the processor 704. System 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions. Other system memory 720 may be available for use as well. The memory 720 can include multiple different types of memory with different performance characteristics. The processor 704 can include any general purpose processor and a service component, such as service 1 (MOD) 710, service 2 (MOD) 712, and service 3 (MOD) 714 stored in storage device 708, configured to control the processor 704 as well as a special-purpose processor where software instructions are incorporated into the actual processor design. The processor 704 may essentially be a completely self-contained computing system, containing multiple cores or processors, a bus, memory controller, cache, etc. A multi-core processor may be symmetric or asymmetric.

To enable user interaction with system 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with system 700. The communications interface 727 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 716, read only memory (ROM) 718, and hybrids thereof.

System 700 can include an integrated circuit 728, such as an application-specific integrated circuit (ASIC) configured to perform various operations. The integrated circuit 728 can be coupled with the connection 706 in order to communicate with other components in system 700.

The storage device 708 can include software services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704, connection 706, output device 724, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A wireless communication network comprising:
   a plurality of first communication protocol nodes configured to communicate using a first communication protocol; and
   a mapping node configured to communicate with the plurality of first communication protocol nodes using the first communication protocol and configured to communicate with a second communication protocol node using a second communication protocol, the mapping node configured to perform a mapping determination by executing at least one of a plurality of different mapping processes upon receipt of a packet by the mapping node, the mapping node configured to map the packet to at least one frame of a first transmission schedule for communicating with the plurality of first communication protocol nodes when the packet is determined to be received from the second communication protocol node per the mapping determination, the mapping node configured to map the packet to at least one resource element of a second transmission schedule for communicating with the second communication protocol node when the packet is determined to be received from the one of the plurality of first communication protocol nodes per the mapping determination,
   wherein the mapping node is configured to synchronize an associated transmission clock of the mapping node with a master clock of a network of the second communication protocol node before, after, or simultaneous to when the packet is received.

2. The wireless communication network of claim 1, wherein the wireless communication network is a short range local area network and the first communication protocol is a deterministic communication protocol.

3. The wireless communication network of claim 2, wherein the second communication protocol is a different deterministic communication protocol than the first communication protocol.

4. The wireless communication network of claim 3, wherein,
   the wireless communication network is a Time Slotted Channel Hopping network;
   the first communication protocol is IPv6 over Time Slotted Channel Hopping (6TiSCH); and
   the second communication protocol is third Generation Partnership Project (3GPP) protocol for Long Term Evolution (LTE) networks.

5. The wireless communication network of claim 1, wherein,
   synchronizing the associated transmission clock of the mapping node with the master clock of the network of the second communication protocol node occurs simultaneously to when the packet is received, and
   the mapping node is configured to perform a mapping of scheduled transmission timeslots based on the synchronizing of the associated transmission clock of the mapping node with the master clock of the network of the second communication protocol node.

6. The wireless communication network of claim 1, wherein the mapping node is a first hop of the wireless communication network and a connection point of the plurality of first communication protocol nodes and the second communication protocol node.

7. The wireless communication network of claim 1, wherein the second communication protocol node is configured to enable communication between the plurality of first communication protocol nodes, the mapping node and at least one node of at least one other wireless communication network with corresponding nodes configured to communicate using the first communication protocol.

8. A method comprising:
   receiving, at a mapping node of a first communication network, a packet for delivery to a destination, the mapping node configured to communicate with a plurality of first communication protocol nodes using a first communication protocol and with a second communication protocol node using a second communication protocol;
   synchronizing, at the mapping node, an associated transmission clock of the mapping node with a master clock of a network of the second communication protocol node before, after, or simultaneous to when the packet is received;

determining, at the mapping node, whether the packet is received from one of the plurality of first communication protocol nodes or from the second communication protocol node to yield a mapping determination by executing at least one of a plurality of different mapping processes;

when the packet is determined to be received from the second communication protocol node per the mapping determination, mapping, by the mapping node, the packet to at least one frame of a first transmission schedule for communicating with the plurality of first communication protocol nodes;

when the packet is determined to be received from the one of the plurality of first communication protocol nodes per the mapping determination, mapping, by the mapping node, the packet to at least one resource element of a second transmission schedule for communicating with the second communication protocol node; and sending, by the mapping node, the packet to the destination based on whether the packet is mapped to the first transmission schedule or the second transmission schedule.

9. The method of claim 8, wherein the synchronizing of the associated transmission clock of the mapping node with the master clock of the network of the second communication protocol node occurs simultaneously to when the packet is received.

10. The method of claim 8, wherein the first communication network is a short range local area network and the first communication protocol is a deterministic communication protocol.

11. The method of claim 10, wherein the second communication protocol is a different deterministic communication protocol than the first communication protocol.

12. The method of claim 11,
wherein,
the first communication network is a Time Slotted Channel Hopping network;
the first communication protocol is IPv6 over Time Slotted Channel Hopping (6TiSCH); and
the second communication protocol is third Generation Partnership Project (3GPP) protocol for Long Term Evolution (LTE) networks.

13. The method of claim 8, wherein the mapping node is a first hop of the first communication network and a connection point between the plurality of first communication protocol nodes and the second communication protocol node.

14. The method of claim 8, wherein the second communication protocol node is configured to enable communication between the plurality of first communication protocol nodes, the second communication protocol node and at least one node of at least one other wireless communication network with corresponding nodes configured to communicate using the first communication protocol.

15. The method of claim 8,
wherein,
the packet is determined to be received from the second communication protocol node to yield a mapping determination and the packet is mapped to the at least one resource element of the second transmission schedule, the resource element is a sub-resource element, and
the method further includes embedding the packet to be encapsulated within an LTE resource block.

16. One or more non-transitory computer-readable media comprising computer-readable instructions, which when executed by one or more processors of a mapping node of a first communication network, cause the mapping node to:

receive a packet for delivery to a destination, the mapping node configured to communicate with a plurality of first communication protocol nodes using a first communication protocol and with a second communication protocol node using a second communication protocol;

synchronize an associated transmission clock of the mapping node with a master clock of a network of the second communication protocol node before, after, or simultaneous to when the packet is received;

determine whether the packet is received from one of the plurality of first communication protocol nodes or from the second communication protocol node to yield a mapping determination by executing at least one of a plurality of different mapping processes upon receipt of a packet;

when the packet is determined to be received from the second communication protocol node per the mapping determination, map the packet to at least one frame of a first transmission schedule for communicating with the plurality of first communication protocol nodes;

when the packet is determined to be received from the one of the plurality of first communication protocol nodes per the mapping determination, map the packet to at least one resource element of a second transmission schedule for communicating with the second communication protocol node; and send the packet to the destination based on whether the packet is mapped to the first transmission schedule or the second transmission schedule.

17. The one or more non-transitory computer-readable media of claim 16, wherein synchronizing the associated transmission clock of the mapping node with the master clock of the network of the second communication protocol node occurs simultaneously to when the packet is received.

18. The one or more non-transitory computer-readable media of claim 16, wherein the first communication protocol and the second communication protocol are different deterministic communication protocols whereby packet transmission schedules are known.

19. The one or more non-transitory computer-readable media of claim 18,
wherein,
the first communication network is a Time Slotted Channel Hopping network;
the first communication protocol is IPv6 over Time Slotted Channel Hopping (6TiSCH); and
the second communication protocol is third Generation Partnership Project (3GPP) protocol for Long Term Evolution (LTE) networks.

20. The one or more non-transitory computer-readable media of claim 16, wherein the mapping node is a first hop of the first communication network and a connection point between the plurality of first communication protocol nodes and the second communication protocol node.

* * * * *